Patented Apr. 7, 1925.

1,532,577

UNITED STATES PATENT OFFICE.

JOSEPH F. CULLEN, OF MIDVALE, UTAH, ASSIGNOR TO UNITED STATES SMELTING, REFINING & MINING COMPANY, A CORPORATION OF MAINE.

METHOD OF MAKING THE ARSENATE OF CALCIUM AND ANALOGOUS ELEMENTS.

No Drawing.   Application filed October 15, 1919.  Serial No. 330,910.

*To all whom it may concern:*

Be it known that I, JOSEPH F. CULLEN, a citizen of the United States, residing at Midvale, in the county of Salt Lake and State of Utah, have invented certain new and useful Improvements in Methods of Making the Arsenate of Calcium and Analogous Elements; and I do hereby declare the following to be a full, clear, and exact description of the invention, such as will enable others skilled in the art to which it appertains to make and use the same.

The invention relates to the manufacture of the arsenate or arsenates of calcium or analogous elements, such as magnesium, or of mixtures of such arsenates, which are suitable for use as insecticides and more particularly to the manufacture of such arsenates of a character suitable for dry dusting. It comprises a method of making such arsenates based on the discovery that they may be commercially produced by the air oxidation of a mixture of arsenic trioxide (white arsenic) and the oxide or hydroxide of calcium or magnesium or mixtures of such oxides or hydroxides.

In the further explanation of the invention reference will be made to a preferred mode of procedure applied to the manufacture of calcium arsenate by the oxidation of a mixture of lime and arsenic trioxide, as indicated in the following equation:

$$3CaO + As_2O_3 + O_2 = Ca_3(AsO_4)_2$$

In accordance with this preferred mode of procedure, burned lime is disintegrated to a fine powder by slaking with water and is thoroughly mixed with powdered arsenic trioxide. Sufficient water may be used to facilitate the intimate mixing of the ingredients as a thin mud. After being allowed to stand for a short time the mud stiffens and can be shoveled into a reverberatory or other furnace suitable for air oxidation. If a larger quantity of water is used the excess may be removed by filtering and the filter cake delivered to the furnace for oxidation. The oxidation to calcium arsenate is rapid when the material is brought to a temperature approximating a red heat, and is accomplished without serious loss of arsenic by volatilization. The weights of the lime and white arsenic employed may be varied to produce the different arsenates, viz:—so-called "neutral," "acid" and "basic" arsenates and mixtures of them.

The changes which take place during the conversion of the lime and white arsenic to calcium arsenate may be further explained as follows. The lime and arsenic trioxide combine and form calcium arsenite when mixed with water. The arsenite formed by this wet reaction will contain combined water and the arsenate produced by its oxidation will be a lighter and more bulky product than would be produced by heating a dry mixture of calcium oxide or hydroxide and arsenic trioxide. The composition of the arsenite will depend upon the proportion in which the ingredients are employed. If used in the proportion of 3 molecules of lime to 1 molecule of arsenic trioxide, the resulting arsenite will have the composition, $Ca_3(AsO_3)_2$, and will be oxidized in the furnace to tricalcium orthoarsenate, $Ca_3(AsO_4)_2$. If used in the ratio of 2 molecules of lime and 1 molecule of arsenic trioxide an arsenite of the approximate composition $Ca_2H_2As_2O_6$, will result, which will yield calcium pyro-arsenate, $Ca_2As_2O_7$, by oxidation in the furnace. This may be further illustrated by the following equations:

$$3CaO + As_2O_3 + water = Ca_3(AsO_3)_2 + water$$
$$Ca_3(AsO_3)_2 + O_2 = Ca_3(AsO_4)_2$$

and, $$2Ca(OH)_2 + As_2O_3 = Ca_2As_2O_5 + 2H_2O$$
$$Ca_2As_2O_5 + O_2 = Ca_2As_2O_7$$

Pure anhydrous tri-calcium orthoarsenate, $Ca_3(AsO_4)_2$, contains approximately 57.8 per cent arsenic pentoxide, $As_2O_5$, and pure calcium pyro-arsenate, $Ca_2As_2O_7$, contains approximately 67.2 per cent arsenic pentoxide. Both of these compounds are appreciably soluble in water and, for this reason, their direct use as insecticide sprays is not desirable. By employing larger quantities of lime in proportion to white arsenic, more basic arsenates are obtained which possess little or no solubility in water. Calcium arsenate intended for use as an insecticide spray may be made to contain approximately 40 per cent arsenic pentoxide. Such regulation or control of the character of the calcium arsenate and of its solubility in water can be regulated in this process by either the initial adjustment of the weights of lime and arsenic trioxide or preferably by subsequent addition of lime or hydrated lime to the furnace product.

For example, lime and arsenic trioxide may be initially mixed in the proportion to yield a calcium arsenate of the approximate composition, 40 per cent $As_2O_5$ and 60 per cent CaO, or the lime and arsenic trioxide may be initially mixed to yield calcium pyro-arsenate and this product subsequently mixed with lime or hydrated lime to yield the product having little or no solubility in water and of the approximate composition, 40 per cent $As_2O_5$ and 60 per cent CaO.

As heretofore indicated the invention may be employed in like manner for the manufacture of dolomitic arsenates and magnesium arsenates by substituting magnesium lime or magnesia for the calcium lime.

The term "hydroxide-forming" used in the claims is intended to include both the oxide and hydroxide.

Those features of the invention which relate particularly to the production of the arsenates by air oxidation at high temperature of a mixture of arsenic trioxide and a hydroxide-forming compound of the alkali-earth metals and in which the arsenites may be said to be formed by dry reaction during the heating rather than by the wet reaction involving admixture of water form the subject matter of a divisional application Serial No. 8678.

While it is preferred to practice the invention in the manner described, it will be understood that this is not essential and that the specific mode of procedure may be variously modified or changed without departing therefrom.

What is claimed is:

1. The method of making arsenate or arsenates of alkali-earth metals which consists in mixing arsenic trioxide and a sufficient quantity of a hydroxide-forming compound of such metals to combine with the arsenic trioxide to form arsenites of such metals and causing the formation of such arsenites, and oxidizing the arsenites to arsenates without material volatilization of arsenic by heating to high temperature in the presence of air.

2. The method of making arsenate or arsenates of alkali-earth metals which consists in mixing with water arsenic trioxide and sufficient hydroxide of such metals to combine with the arsenic trioxide to form arsenites of such metals, and heating the mixture in the presence of air to oxidize the arsenite to arsenate without material volatilization of arsenic.

3. The method of making calcium arsenate which consists in mixing with water arsenic trioxide and slaked lime in proportions to unite and form arsenite or arsenites without material excess of arsenic trioxide, and heating the mixture in the presence of air to oxidize the arsenites to arsenates without material volatilization of arsenic.

4. The method of making arsenate or arsenates of alkali-earth metals which consists in mixing with water arsenic trioxide and sufficient hydroxide-forming compound of such metals to combine with the arsenic trioxide to form arsenites of such metals, and heating the mixture in the presence of air to oxidize the arsenite to arsenate without material volatilization of arsenic.

5. The method of making arsenate or arsenates of alkali-earth metals which consists in mixing with water arsenic trioxide and a hydroxide-forming compound of such metals in substantially the proportions of their combining weights, and heating the mixture in the presence of air to form the arsenates without material volatilization of arsenic.

6. The method of making insecticide arsenate or arsenates of alkali-earth metals which consists in mixing with water arsenic trioxide and a hydroxide-forming compound of such metals, heating the mixture in the presence of air to form arsenates without material volatilization of the arsenic, and reducing the water solubility of the product by subsequent addition of said compound.

7. The method of making insecticide calcium arsenate which consists in mixing with water arsenic trioxide and lime in substantially the proportions of their combining weights, heating the mixture in the presence of air to form arsenates without material volatilization of arsenic, and adding lime to reduce the water solubility of the product.

8. The method of making insecticide calcium arsenate which consists in mixing with water arsenic trioxide and slaked lime in proportions to unite and form arsenite without material excess of arsenic trioxide, heating the mixture in the presence of air to oxidize the arsenite without material volatilization of arsenic, and adding lime to reduce the water solubility of the product.

9. The method of manufacturing insecticide calcium arsenate which consists in oxidizing at high temperature a mixture of water and of arsenic trioxide and lime in proportions to produce arsenates containing comparatively high percentages of arsenic acid and appreciably soluble in water, and by subsequent treatment reducing the water solubility and the percentage of arsenic acid in the product.

JOSEPH F. CULLEN.